Jan. 26, 1937.  G. M. PESTARINI  2,068,867
HIGH VOLTAGE ELECTRICAL PLANT
Filed Dec. 29, 1933   2 Sheets-Sheet 1
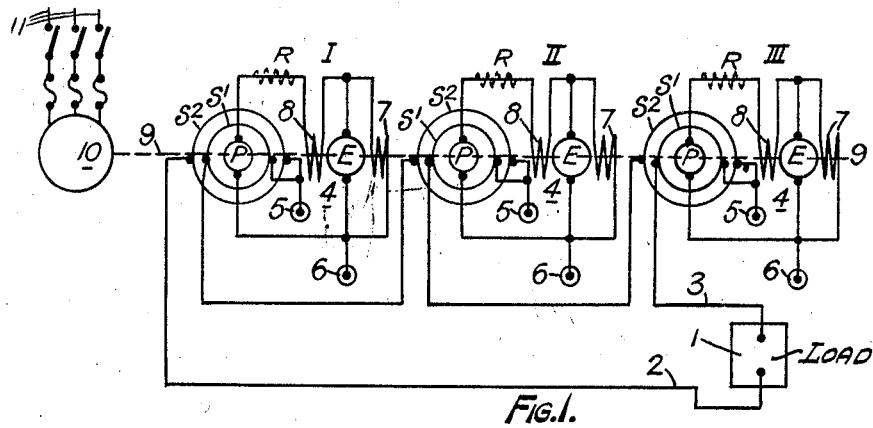
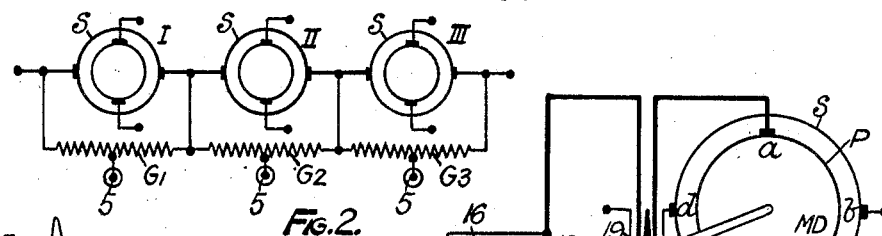
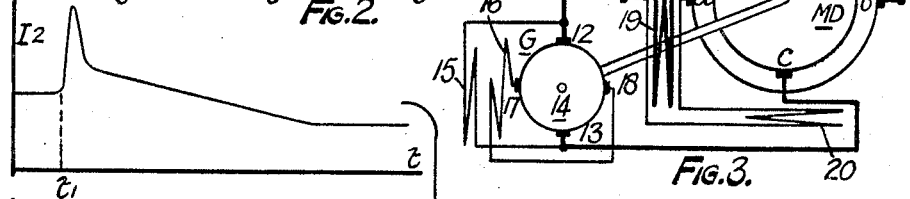
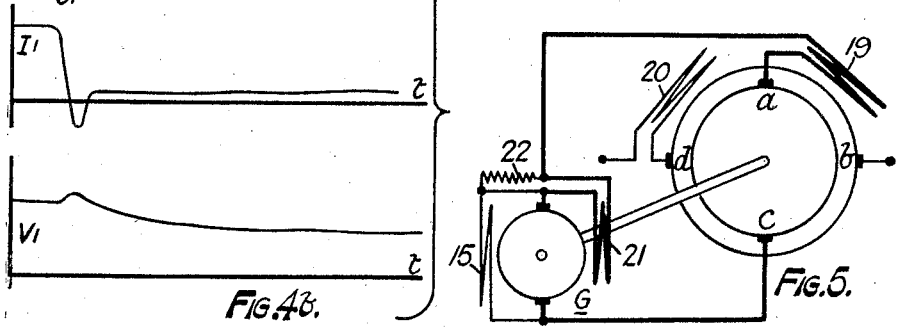
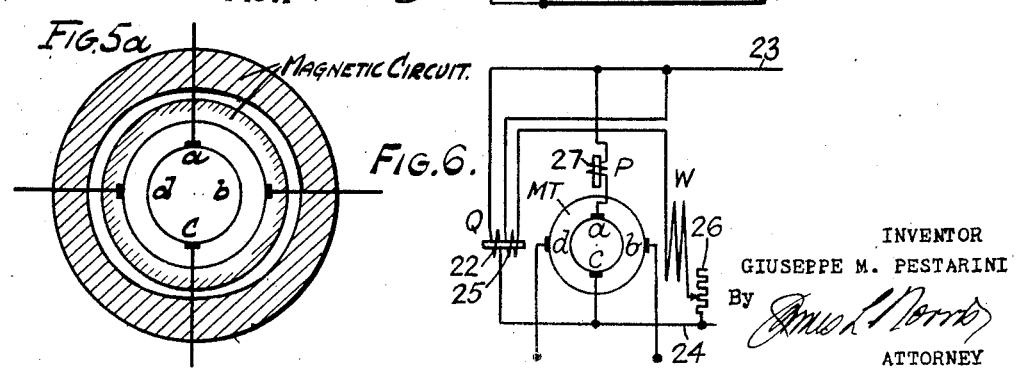
INVENTOR
GIUSEPPE M. PESTARINI
ATTORNEY

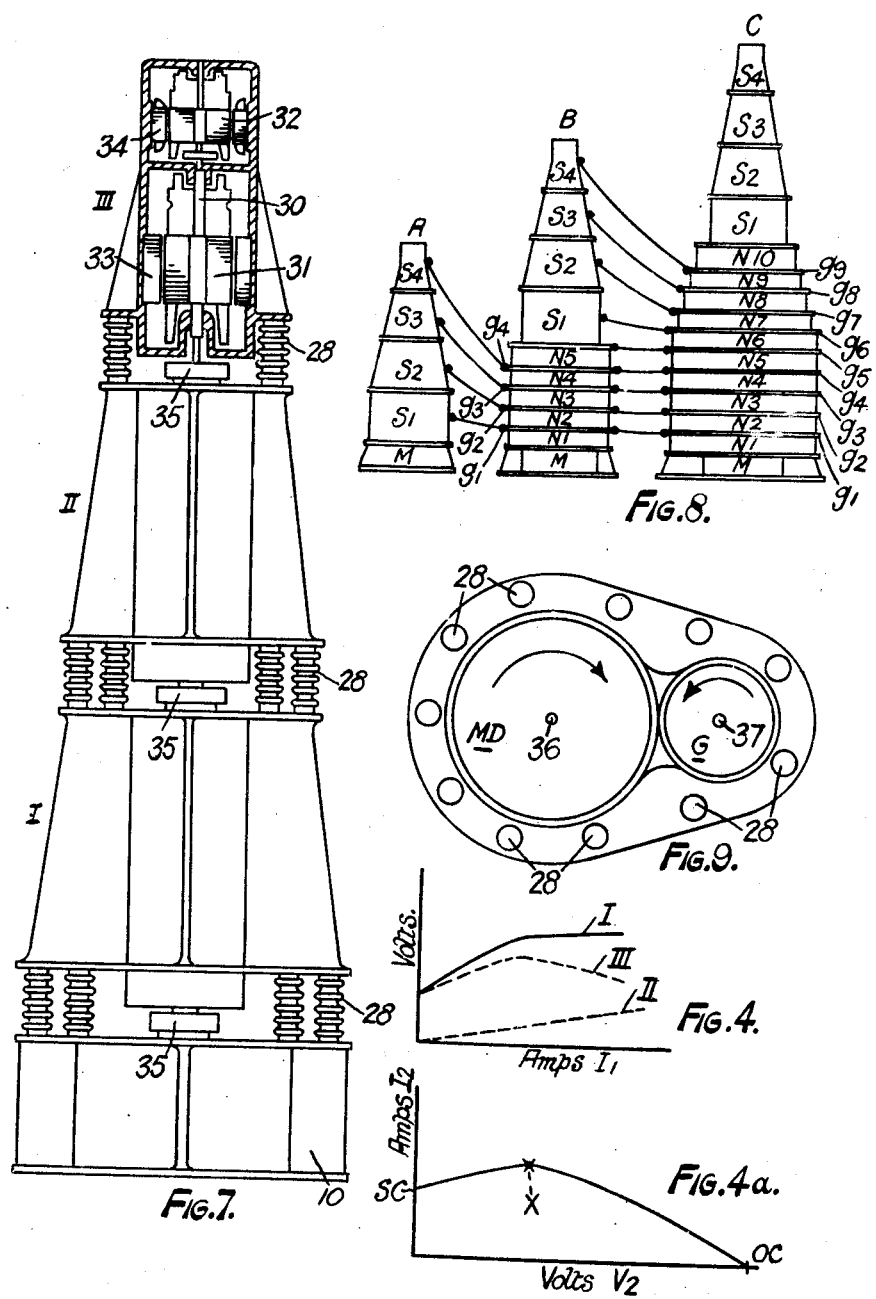

Patented Jan. 26, 1937

2,068,867

UNITED STATES PATENT OFFICE 2,068,867

HIGH VOLTAGE ELECTRICAL PLANT

Giuseppe Massimo Pestarini, Sheffield, England

Application December 29, 1933, Serial No. 704,568
In Great Britain January 23, 1933

10 Claims. (Cl. 183—7)

This invention relates to an electrical plant of the kind in which direct current electrical energy at a high voltage is supplied to a load device which during operation is subject to short-circuit of the load or sudden changes of load. For example, such load devices may comprise thermionic discharge tubes the anode circuits of which are supplied at high voltage, and notably such discharge tubes of the dismountable continuously evacuated type in which faults, such as arcing or gaseous or other flash-overs are liable to occur. The invention is also well adapted for the supply of such discharge tubes with high voltage electrical energy during the process known as "conditioning", that is, the preliminary step of evacuation and degasification which is necessary before such devices can be brought into satisfactory normal operation. The invention is also notably applicable to the electrical precipitation of dust or other solid particles from an atmosphere in the well known way in which a high electric voltage is applied to two electrodes located in said atmosphere a suitable distance apart.

According to the present invention, an electrical plant comprises in combination a high voltage direct current load device, namely constructed for operation at a voltage of at least about 5,000 volts and in which during operation short-circuit of the load or sudden changes of load may occur, a metadyne transformer or generator having at least two armature windings and respective commutators, of which the brushes associated with one winding and commutator, referred to as the secondary brushes, winding and commutator respectively, are connected with said load device, and means for connecting the brushes associated with another winding and commutator, referred to as the primary brushes, winding and commutator respectively, with a source of direct current electrical energy at a lower voltage, namely of the order of a few hundred volts.

A metadyine is a rotary apparatus which is designed to transform a direct current supplied to it at a fixed voltage and variable amperes into a current of substantially constant amperes and variable voltage or into a current which is related to the voltage in accordance with a desired law. The apparatus comprises in its simplest form a rotor provided with windings and a commutator similar to the armature of a direct current dynamo electric machine. Ordinarily two pairs of brushes are arranged to make contact with the commutator, the primary current passing into and out of the rotor by one pair and the secondary current being available at the other pair. The rotor is rotated at constant speed by an external motor or other means are provided by which the total power input to the metadyne is automatically adjusted to be equal to the sum of the output and the losses in the machine at a particular speed so as to maintain the armature in rotation at this speed. The primary current flowing in the rotor windings sets up a primary flux which is fixed in direction and may be said to be cut by rotor conductors in which a voltage is thereby induced and a constant secondary current can be drawn from the secondary circuit or circuits at variable voltage. A stator is provided which affords a return path of low magnetic reluctance for the fluxes which are set up by the rotor currents, and said stator may be furnished with windings by which various magnetic fluxes can be obtained which combine with or modify the magnetic fluxes due to the primary and secondary currents circulating in the rotor and thereby regulate the electro-mechanical performance of the machine. A description of the general construction and operation of metadyne machines will be found in a paper entitled "Esquisse sur la Metadyne" by G. M. Pestarini in the Bulletin Scientifique A. I. M. No. 4 April 1931 of L'Association des Ingenieurs Electriciens, published by the Institut Electrotechnique Montefiore, Liége.

With the arrangement according to the present invention, in the event of a fault such as arcing, or gaseous or other flash-over occurring, the secondary current will tend to increase, but owing to the peculiar characteristics of the metadyne this increase will very rapidly stop, and at the same time the secondary voltage will decrease very rapidly until the fault is cleared. Immediately after this the secondary voltage increases again and if the fault is of a temporary nature normal conditions are very quickly restored.

In the arrangement according to the present invention, the source of lower voltage may provide a substantially constant voltage, and in order to limit the primary current which flows when the secondary circuit is opened, a resistance may be included in the primary circuit, or the metadyne may be provided with a field winding which is connected in series with the primary brushes of the metadyne and the lower voltage sources, and arranged to produce at said brushes an electromotive force opposing the current supplied thereto. Said lower voltage source may comprise a generator, hereinafter referred to as the primary generator, which is mechanically coupled with the metadyne, said primary generator and metadyne being adapted to be rotated as a unit from a prime mover or an electric motor, and said primary generator and metadyne may be arranged so that the speed of the former may be adjusted with respect to that of the latter, whereby the output from the metadyne may be adjusted.

According to a further feature of the invention, an electrical plant for supplying electrical energy at a high direct current voltage to a load device in which during operation short circuit of the load or sudden changes of load may occur, comprises a metadyne transformer or generator, and a primary generator as just above described, and excitation arrangements for said primary generator adapted to cause the voltage generated thereby to vary in accordance with variations of current supplied thereby to the metadyne. The voltage may be caused to fall as the primary current rises, so that the primary voltage falls upon the secondary circuit being opened and limitation of the primary current under such conditions is thus obtained. Alternatively the primary generator voltage may be caused to fall with reduced primary current, whereby under short circuit conditions on the secondary circuit the primary voltage falls and further limitation of the secondary current over and above the action of the metadyne is obtained, whilst in order to limit the primary current upon opening of the secondary circuit, the primary generator is arranged to become magnetically saturated to a sufficient extent to produce a limiting effect on the primary voltage, and means comprising a resistance in the primary circuit or a winding on the metadyne as hereinbefore referred to, are employed. Such arrangement is especially useful where it is desired to obtain, under short circuit conditions, a secondary current which is lower than the normal secondary current.

The metadyne transformer or generator may be connected in series with a generator, which is not a metadyne, to provide the required high voltage, the other generator supplying up to approximately half the total voltage generated. Such arrangement will accomplish the desired regulation of the load current, namely the load current will be limited on short-circuit, since under this condition the metadyne is capable of producing a reverse voltage rather than allowing the current to increase abnormally. A plurality of generating units may be provided with their output terminals connected in series with one another to provide the required high voltage. Said generating units may all comprise metadyne transformers or generators, or both metadynes and generators which are not metadynes may be employed, the metadyne supplying at least approximately half the total voltage generated, and in the latter case the metadyne units are preferably connected in the series circuit alternately with the other generators.

Arrangements of machines are well known in which a plurality of direct current machines, for example, are connected electrically in series so that the several voltages of the machines are added together, the machines being insulated from one another and from the driving machines and mechanically coupled by insulating couplings. With such arrangements it is necessary that the insulation between each machine and ground shall progressively increase as the difference of potential between the terminals of a machine and ground increases, so that the strain on the insulation between the windings of the machine and its frame due to the potential therebetween will not be increased. The insulation between ground and the last machine in the series where the maximum voltage occurs must, consequently, be extremely heavy.

According to a further feature of the invention, where a plurality of generating units are employed having their output terminals connected in series, which generating units may or may not be metadyne units, said generating units are supported from one another in pile or tower formation, preferably with their driving axes arranged vertically, by insulation elements located between adjacent machines, the machine having the highest terminal voltage with respect to earth being located at the top of the tower whilst the shafts of the machines are mechanically connected together by insulating couplings. The invention also comprises arrangements as set forth above in which the machines are arranged in two or more piles or towers, the machines in the several towers being connected in series with one another. The invention provides special arrangements for the grading of the insulation between the various machines of a plurality of machines connected in series, and ground, as will hereinafter be described.

The invention further comprises certain subsidiary features as will hereinafter be described and pointed out in the appended claims.

In order that the invention may be fully understood and readily carried into effect, various embodiments thereof will now be described by way of example with reference to the accompanying drawings, in which Fig. 1 is a diagram showing the electrical circuits of one arrangement of apparatus comprising three generating units in accordance with the invention.

Fig. 2 is a diagram showing an alternative arrangement of a subsidiary feature of the apparatus shown in Fig. 1.

Fig. 3 is an electrical diagram of an arrangement of metadyne and generator in accordance with the invention.

Figs. 4, 4a and 4b are diagrams of curves employed for describing the action of the arrangement shown in Fig. 3.

Fig. 5 is a diagram similar to Fig. 3 of an alternative arrangement in accordance with the invention.

Fig. 5a is a diagram of another arrangement in accordance with the invention.

Fig. 6 is an electrical connection diagram showing a metadyne provided with interpoles which are excited in accordance with the further feature of the invention.

Fig. 7 is a part sectional side elevation of somewhat diagrammatic nature showing a construction of a plurality of metadynes arranged vertically in accordance with the invention.

Fig. 8 is a diagrammatic side elevation of a plurality of piles or towers of metadynes having the grading arrangements hereinbefore referred to, and Fig. 9 is a plan view illustrating diagrammatically a modification of the arrangement shown in Fig. 7.

Referring to Fig. 1, the load device such as the anode circuit of a thermionic discharge device, or the electrodes of a conventional electric dust precipitator is indicated at 1, having leads 2 and 3 with which the terminals of the generating machine are connected. Each of the three metadyne units I, II, III comprises a metadyne having two secondary armature windings each giving 15,000 volts for example and respective commutators indicated at S1 and S2 and a primary armature winding which may be of low voltage for example 110 volts and associated commutator indicated at P. A direct current generator 4 having an armature E supplies electrical energy to brushes located on the primary commutator P of the associated metadyne. Each secondary commutator is provided with a pair of brushes and as shown the pairs of secondary brushes of each metadyne are connected in series with one another and with the secondary brushes of the other metadynes to the leads 2 and 3, whereby the voltage applied across said leads is the sum of the voltages generated in the six secondary windings of the three metadynes. The two brushes which on each metadyne are connected together are also connected to the frame of said metadyne as indicated at 5 so that the frames are connected to the secondary windings at a potential intermediate the secondary terminal voltage of each metadyne unit whilst the primary circuit of each unit is connected with the frame of the machines as indicated at 6.

Each generator 4 is provided with a shunt connected field winding 7 and a series connected winding 8 which is arranged to oppose said shunt winding whereby a falling characteristic is obtained at the secondary terminals of the metadyne. In an alternative arrangement for obtaining such falling characteristic the series windings 8 are replaced by resistances indicated in broken lines at R inserted in the respective primary circuits. The armatures of the several metadynes and generators are mounted on the common axis indicated by the broken line 9 the shafts of the several machines being provided with insulating couplings (not shown) between each of the units I, II and III, and said shaft is coupled with an electric motor 10 indicated as a three-phase motor energized from the three-phase supply conductors 11 from which the energy expended in the secondary circuit of the metadynes is ultimately obtained. It will be obvious that any other form of motor or a prime mover may be employed in place of the electric motor 10 shown.

In the operation of the apparatus above described the following results are obtained substantially automatically.

The current in the secondary circuit cannot be caused to rise higher than a comparatively small amount, for example from ten to twenty per cent, above the normal, and this rise will only occur for a very short time. The metadyne may if desired be so designed that upon the occurrence of an arc in the apparatus 1 between the leads 2 and 3 the secondary voltage of the metadyne is reversed until the said arc discharge is stopped, whereby a very quick action to suppress such arc discharges is obtained. Flashovers between the high voltage brushes, that is the secondary brushes, on the commutators S1 and S2, are much less likely to occur than in an ordinary dynamo machine because the current can only change to a small extent as above mentioned, and also it is a property of the metadyne that flashovers between the secondary brushes are of infrequent occurrence. Faults in the load device 1 which have the effect of short-circuiting the leads 2 and 3 will not affect the machine, and the only effect of an open secondary circuit will be to increase the primary current to a value limited by the effect of the series excitation windings 8 of the generators when said windings are present. If desired, for obtaining the desired characteristic of the metadyne, alternatively or in addition to the reverse series winding 8, the metadyne may be provided with a field winding in series with the primary or low voltage circuit such that the electromotive force which it produces in the metadyne rotor winding opposes the voltage supplied to the primary brushes.

Since separate windings and commutators insulated from one another are provided for the primary and secondary circuits respectively, the primary voltage may be arranged to be of any desired value lower than the secondary voltage so that the generators 4 are required only to be low voltage generators, for instance of 110 volts as hereinbefore described.

In order to reduce the size of the generators 4 and of the primary winding on the metadyne rotor, the metadyne may be provided with field windings which set up a flux in the metadyne acting in the same direction as that due to the primary current flowing in the metadyne armature, whereby part of the power obtained from the secondary terminals of the metadyne will be transmitted mechanically through the shaft 9 from the motor 10 to the metadyne armature. In fact the torque T, developed by a metadyne, the iron of which is supposed to be far from saturation for the sake of simplicity, is the resultant of two torque components, the first one being proportional to the product of the primary flux $F_1$ and the secondary current $I_2$, the second one being proportional to the product of the secondary flux $F_2$ and the primary current $I_1$.

$$T = F_1 I_2 + F_2 I_2$$

The first component is generally a resistant torque and the second one an accelerating torque. If their sum is zero, $T=0$, then the whole output of the metadyne must be supplied by the primary source to which the primary brushes are connected. If the resultant torque is negative $T<0$, then only a part of the metadyne output is supplied by the primary source and the remaining is supplied mechanically by the shaft being rotated. The more negative therefore, the resultant torque, the less will be the energy needed from the primary source and therefore the smaller will be the size of the necessary primary source. In order to make T negative as much as possible $F_1$ is increased either by providing a stator winding which increases the primary flux, or by reducing the reluctance of the magnetic circuit in the direction of the primary rotor ampere turns. A similar result gives the reduction of the secondary flux $F_2$ by increasing the reluctance of the magnetic circuit in the direction of the secondary rotor ampere-turns.

The winding 19 of Fig. 5 gives a flux having one component in the direction of the brushes c a of the primary rotor ampere turns and therefore it reduces the necessary output of the primary generator G. Alternatively or in addition, for the same purpose the metadyne may be arranged with a magnetic circuit which presents a higher reluctance to the secondary flux than to the primary flux, such result preferably being obtained by making the air-gap of elliptical form, said air-gap being of greater length on the secondary commutating axis than on the primary commutating axis. This construction is illustrated in Fig. 5a of the drawing.

In Fig. 2 is shown an alternative arrangement which may be employed to connect the secondary winding of the metadyne with the frame of the metadyne at a potential intermediate the secondary terminal voltage and which is particularly useful when only one secondary winding is provided on each metadyne. As shown across the secondary brushes on the secondary commutator S of each machine there is connected a resistance G1, G2, G3 the centre point of which is connected with the frame of the respective metadyne as indicated at 5. Such an arrangement will also result in an improved stability of operation. The resistance across each metadyne may be arranged to absorb at normal voltage about 10 per cent of the metadyne secondary current, and may comprise for example rods of carbon or silicon or similar material.

Referring now to Fig. 3 which shows a metadyne and generator forming a unit in accordance with the invention, and which may be arranged in combination with other similar units in the same way as the units I, II, III of Fig. 1, the metadyne is indicated at MD, and is indicated as having a primary winding and a commutator P and a separate secondary winding and a commutator S. The primary brushes a and c are connected with the brushes 12 and 13 of a generator G which is of special form, comprising an armature 14 excited by a shunt connected field winding 15 and a further field winding 16 which is connected across a pair of auxiliary brushes 17 and 18 located on the commutator electrically at right angles to the brushes 12 and 13. The winding 16 is energized by the cross flux due to the armature 14 and the strength of the field which said winding produces is thus dependent upon the primary current taken by the metadyne MD. With the arrangement as thus far described the field winding 16 may be arranged to oppose the shunt winding 15 whereby operation similar to that of the arrangement shown in Fig. 1 will be obtained. However, instead of using winding 16 to obtain a falling characteristic of the current as a function of the secondary voltage of the main metadyne, it is preferable to connect the winding 16 in such a way as to obtain a rising characteristic of the current supplied by the brushes b, d of the main metadyne as a function of the voltage at these brushes, that is to say, a rising characteristic at least for low values of the voltage at the secondary brushes b, d, and according to Fig. 3, said field winding 16 is arranged to assist the winding 15 so that a rising characteristic is obtained at the brushes 12 and 13. With this arrangement the secondary current which will flow upon short circuit of the metadyne brushes b and d will be further limited over and above the action of the metadyne due to the reduction of the primary current which then occurs, such reduction of primary current resulting in reduced primary volts due to the rising characteristic of the generator G. In order to limit the current which flows in the primary circuit upon opening of the secondary circuit of the metadyne, the generator G is arranged to become magnetically saturated at a predetermined voltage and the metadyne is provided with a winding 19 which is traversed by the primary current and produces at the primary brushes a and c of the metadyne a voltage opposing the primary current. Alternatively a resistance may be included in the primary circuit for the same purpose. With this arrangement upon short circuit of the secondary brushes b and d the secondary current will suddenly increase to a comparatively high value above the normal for instance of the order of twice the normal value but will substantially immediately be reduced to a value intermediate the normal value and the comparatively high value above referred to. Such reduction of the current is due to the action of the metadyne and thereafter the current will fall at a lower rate to a value which is very similar to the normal value, such further reduction being due to the reduction of the generator voltage consequent upon the fall in primary current of the metadyne which occurs on short circuit due to the reduced secondary voltage. If said generator is arranged to be highly saturated the steady short circuit current may even be lower than under normal conditions. Figs. 4, 4a and 4b indicate the operation under such conditions. In Fig. 4, in which voltages are plotted as ordinates against the primary current I, the curve I shows the voltage generated at the terminals of the generator G, the curve II shows the back electromotive force produced in the metadyne primary winding P at the brushes a and c by the coil 19, and the curve III shows the difference between these voltages, an electromotive force equal and opposite to this difference being generated in the winding P due to the current flowing in the armature secondary winding S producing a magnetic flux of appropriate magnitude to cause generating in the winding P of the said electromotive force. Fig. 4a shows the corresponding characteristic obtained at the secondary brushes b and d of the metadyne, the secondary current I₂ being plotted as ordinates and the secondary voltages V₂ as abscissae. The plant is arranged to operate at the point x on this characteristic during normal conditions. As will be seen the secondary short circuit current S. C. is of smaller value than the normal working current, whilst the secondary voltage is limited to O. C. on open circuit of the secondary. In Fig. 4b the secondary current I₂, the primary current I₁ and primary volts V₁, are plotted as a function of time, the short circuit being assumed to occur at the instant t1.

The metadyne may be provided with a series field winding 20 connected in series with the secondary circuit as shown in Fig. 3 and arranged to produce at the brushes b, d a voltage acting in opposition to the secondary current.

In Fig. 5 an alternative arrangement to that of Fig. 3 is shown. In this arrangement the generator G is of normal type in that only one pair of brushes is provided on the commutator. The generator is provided with a shunt winding 15 as in Fig. 3 whilst a rising characteristic is obtained by means of a series winding 21 included in the primary circuit and arranged to assist the shunt winding under normal conditions. In order that the series winding 21 shall not adversely affect the stability of operation of the system a resistor 22 is connected across said winding. As in Fig. 3 the metadyne is provided with a winding 19 connected in series in the primary circuit and arranged to produce at the brushes a and c a voltage opposing the voltage supplied thereto by the generator G. A winding 20 acting similarly to the winding 20 of Fig. 3 is also provided. The winding 19 is arranged on the metadyne stator on a pair of diametrically opposite poles one pole of which pair is located between the points on the armature windings with which the brushes a and b are connected whilst the other pole of said pair is located between the points on the armature windings with which the brushes c and d are connected. The winding 20 is arranged on the other pair of poles and this arrangement results in the maximum mutual inductance being obtained between the secondary and primary circuit so that when the secondary current suddenly increases under fault conditions there is an immediate tendency to reverse the primary current and the primary flux by transformer effect. The winding 19 furthermore causes part of the power in the secondary circuit to be transmitted from the motor 10 through the shaft 9 to the metadyne rotor. The arrangement shown also possesses the advantage that only one coil is required on each stator pole of the metadyne.

The characteristic of the metadyne should be so arranged for stable operation as to intersect the characteristic of the device which is supplied thereby, and in cases where the operating conditions of said device are variable, and the characteristic of the latter may therefore take up various positions, the metadyne characteristic should be arranged to intersect the zone which is bounded by the characteristic curves which represent the extreme conditions of operation of the load device.

Where the metadyne is provided with interpoles to reduce sparking at the secondary brushes such interpoles may be excited by windings connected across the primary circuit, and where the metadyne is provided with a variator winding which produces an exciting field for the metadyne rotor opposing that due to the secondary current an additional winding may be provided on the interpoles in series with the variator winding which additional winding assists the first mentioned interpole winding. Fig. 6 shows the latter arrangement in which the secondary interpole Q carries a winding 22 energized directly from the conductors 23 and 24 which supply the primary current to the metadyne and the winding 25 which is connected in series with the variator winding shown at W, and an adjustable rheostat 26, across the conductors 23 and 24. Adjustment of the rheostat 26 enables regulation of the output at the metadyne to be effected. Such arrangement obviates the necessity for a high voltage interpole winding of many turns as would be necessary if the interpoles were to be excited by windings in series with the secondary circuit in the usual manner since the plant operates at a high voltage with a relatively small current. The primary interpoles P may be excited by series winding such as 27 in the ordinary way.

Referring now to Fig. 7, three generating units I, II, III are arranged in vertical formation one above the other, insulation elements 28 being interposed between adjacent machines and between the machine I and motor 10 upon which the machines are arranged. The unit III is shown diagrammatically in section, the shaft, which is arranged vertically, being indicated at 30 and carrying the metadyne armature 31 and the armature 32 of a generator which supplies the primary circuit of the metadyne. The stator systems of the metadyne and the generator are shown respectively at 33 and 34. The shafts such as 30 of the units I, II and III and of the motor 10 are coupled together by insulating couplings 35. The secondary windings of the metadynes are connected in series, the machine III having the highest terminal voltage with respect to earth. The insulation elements 28 are each proportioned to withstand the difference of potential between the terminals of the adjacent machine of higher voltage, and as will be seen by this arrangement the insulation between a machine and ground will progressively increase from the base of the tower upwards as the insulation resistances of the several sets of insulation elements 28 are added in progressing from the lowest unit I of the tower to the unit III. Such arrangement has the advantage that the said insulation elements 28 are used in the most economical manner since they may all be electrically stressed to the same extent. In order to reduce the potential between the terminal of the uppermost machine (such as III) in a tower and ground, the terminals of one of the intermediate machines (such as I or II) may be connected to ground.

Where a very high voltage is required involving the use of a large number of single machines the machines may be arranged in the form of a plurality of towers with the high voltage terminal of the machine at the top of one tower connected to the low voltage terminal of the lowest machine of the next tower in succession. Fig. 8 shows such an arrangement in which three separate piles or towers are used, each of the towers A, B, C comprising a driving motor M and four metadyne units S1, S2, S3, and S4. In the case of the tower A the insulation between the various machines may be arranged in the same manner as that shown in Fig. 7. In the tower B, however, the insulation between the machine S1 and the motor M must be equivalent to the sum of the insulation element between the several machines on the first tower, together with the insulation between the lowest machine of the last said tower and the ground which in the case of Fig. 7 is the insulation between the motor 10 and the unit I. Such insulation is indicated in Fig. 8 by the references N1, N2, N3, N4, N5, Fig. 8 showing an arrangement of grading such insulation as will hereinafter be described. In the case of the tower C the insulation between the unit S1 and the motor M comprises the sections N1 . . . N10, such insulation being equivalent to that of the whole of the insulating elements between the machine S4 and the motor M in the tower B.

In order to improve the distribution of stress in the insulation between ground and the lowest machine of the second or later tower of a series of towers such insulation is divided into a plurality of elements, namely N1 . . . N5 in the tower B and N1 . . . N10 in the tower C. As hereinbefore indicated the number of elements into which such insulation of each tower is divided is greater by one than the number of machines in the previous tower or towers in the series. Metallic separators g1, g2, g3 and g4 are provided between the insulation elements in the tower B and similar metallic separators g1 . . . g9, in the tower C, and said separators are connected to the terminals of the several machines forming the previous tower or towers in the manner shown. By this means the entire potential difference between the lowest machine of either tower B or C and ground, which potential is equal to the sum of the potential differences of the machines connected in series up to this point is distributed substantially equally over the various insulator elements and the latter is thus used in the most economical manner. As will be obvious, additional metallic separators which are not connected with the terminals of the units in a previous tower may be employed in the insulation elements if desired.

In the arrangement shown in Fig. 7 each metadyne is provided with a separate generator supplying its primary circuit with electrical energy, which generator is arranged coaxially with the metadyne. In an alternative arrangement in which each metadyne is provided with an associated generator, the latter may be arranged in a separate pile or tower, the axis of which is parallel with that of the axis of the pile of metadynes with which they are associated, and which is insulated in same manner. A separate motor may be provided for driving the exciters or such exciters may be driven from the generators through suitable gearing. Fig. 9 shows in plan view such arrangement, the metadyne being indicated generally at MD and the generator at G and the respective rotor shafts at 36 and 37. In some cases the speed at which the primary generators are driven may be different from that of the metadynes in order to facilitate the control of the apparatus without touching any part brought to high voltage. Furthermore, the primary generators may be rotated in the reverse direction to the direction of rotation of the metadynes as indicated by the arrows in Fig. 9, whereby the torque reaction on the insulators supporting the machines is proportional to the difference of the torques on the shafts 36 and 37 instead of being proportional to the sum of said torques. In the construction shown by Fig. 9 the frames of each metadyne MD and its associated generator G are encircled by a stiffening plate 38 between which and the stiffening plate of the adjacent machines the requisite number of insulator elements such as 28 are located. Where the primary generators are driven by a motor separate from that which drives the metadynes, provision may be made for varying the speed of the primary generators relative to the metadynes whereby the voltage and output of the complete set of primary generators may readily be controlled.

In the arrangement shown in Fig. 8 the speeds of the machines in the several towers a, b, and c may be the same or may be different as desired.

It will be understood that in certain cases the lowermost unit, such as the unit I in Fig. 7, may be supported directly from the motor 10 or from earth, namely without the interposition of the lowermost set of insulation elements 28 shown in Fig. 7. It will further be appreciated that the generating units are not necessarily arranged with their driving axes vertical as shown in Figs. 7 and 8, but may be arranged with said axes horizontal and be mechanically coupled with the motive means by means of belts or a vertical shaft and bevel gears, for example.

A similar grading arrangement to that shown in Fig. 8 may be employed in plants comprising a plurality of generating units which units are not disposed one above the other as in Figs. 7 and 8, but in which each unit is separately supported from earth by respective insulation. Thus the insulation supporting each unit may be divided into a number of elements by metallic separators which are electrically connected with the terminals of the generating units at lower voltages so as to determine the distribution of voltage over the insulation, in a similar manner to the arrangement shown in Fig. 8.

I claim:—

1. In a dust precipitating plant by means of electrostatic action, a precipitating chamber provided with high voltage electrodes, a source of current of the "metadyne" type supplying a direct current at substantially constant intensity at high voltage to the electrodes of the precipitating chamber, said "metadyne" source or current being a direct current machine comprising a rotor with winding and associated commutator and a stator mainly affording a path for the flux created by the rotor ampere turns, and bearing generally two sets of brushes, the current traversing one set creating by its ampere-turns a flux that induces an E. M. F. between the brushes of the other set, one set of brushes called primary, being traversed by a current at substantially constant voltage and the other set of brushes, called secondary, being connected by the electrodes, the said current source supplying to the high voltage electrodes of the precipitating chamber an E. M. F. increasing until the "corona" effect is obtained in the precipitating chamber, said corona effect absorbing a current equal to the current of substantially constant intensity supplied by the metadyne source of current the said source having a stator winding connected in series with the primary brushes and inducing by its ampere-turns an E. M. F. between the primary brushes, opposing the primary current.

2. In a dust precipitating plant by means of electrostatic action, a precipitating chamber provided with electrodes, a plurality of generators of the metadyne type connected in series, supplying a direct current of substantially constant intensity at high voltage to the electrodes of the precipitating chamber, the value of this voltage increasing until the "corona" effect is obtained in the precipitating chamber, said corona effect absorbing a current equal to the current of substantially constant intensity supplied by the metadynes, the rotor of the said machines having three windings associated with separate commutators, one winding — the primary — being made for low voltage and having brushes associated with it maintained at a substantially constant voltage, and the other two windings—the secondary windings—being made for high voltage and having their brushes connected in series and supplying the electrodes.

3. In a dust precipitating plant by means of electrostatic action, a precipitating chamber provided with electrodes, a primary generator, a plurality of generators of the metadyne type connected in series, supplying a direct current of substantially constant intensity at high voltage to the electrodes of the precipitating chamber, the value of this voltage increasing until the "corona" effect is obtained in the precipitating chamber, said corona effect absorbing a current equal to the current of substantially constant intensity supplied by the metadynes, the primary brushes of the said metadynes being connected to the primary generator provided with electrical connections between the brushes of said primary generator and primary brushes of said metadyne and excitation arrangements for said primary generator adapted to cause the voltage generated thereby to vary in accordance with variations of current supplied thereby to said metadynes, while for the limiting value of the current supplied by said generator to said metadynes, said primary generator, is arranged to be magnetically saturated when the voltage generated thereby reaches a predeterminate value, a resistance being connected in series with the connection between the brushes of the primary generator and the primary brushes of the metadynes.

4. In a dust precipitating plant by means of electrostatic action, a precipitating chamber provided with electrodes, a plurality of generators of the metadyne type connected in series, supplying a direct current of substantially constant intensity at high voltage to the electrodes of the precipitating chamber, the value of this voltage increasing until the "corona" effect is obtained in the precipitating chamber, said corona effect absorbing a current equal to the current of substantially constant intensity supplied by the metadynes, a main generator feeding the primary brushes of the said metadynes said generator having two auxiliary brushes at 90° of the primary brushes, the auxiliary brushes of the said generator feeding a stator winding of the said generator arranged to cause the voltage supplied to the metadynes to vary slightly as the supplied current varies.

5. In a dust precipitating plant by means of electrostatic action, a precipitating chamber provided with electrodes, a primary generator, a plurality of generators of the metadyne type connected in series, supplying a direct current of substantially constant intensity at high voltage to the electrodes of the precipitating chamber, the value of this voltage increasing until the "corona" effect is obtained in the precipitating chamber, said corona effect absorbing a current equal to the current of substantially constant intensity supplied by the metadynes, the metadynes beng provided with a stator winding which creates ampere-turns in the same direction as the rotor ampere-turns due to the current of the primary generator, causing the electrical energy needed from the primary generator to be reduced.

6. In a dust precipitating plant by means of electrostatic action, a precipitating chamber provided with electrodes, a primary generator, a plurality of generators of the metadyne type connected in series, supplying a direct current of substantially constant intensity at high voltage to the electrodes of the precipitating chamber, the value of this voltage increasing until the "corona" effect is obtained in the precipitating chamber, said corona effect absorbing a current equal to the current of substantially constant intensity supplied by the metadynes, the said metadynes having a magnetic circuit arranged to afford a lower magnetic reluctance in the direction of the rotor ampere-turns due to the primary current, and a higher reluctance in the direction of the rotor ampere-turns due to the secondary current, causing thus the energy needed from the primary generator to be reduced.

7. In a dust precipitating plant by means of electrostatic action, a precipitating chamber provided with electrodes, a plurality of generators of the metadyne type connected in series, supplying a direct current of substantially constant intensity at high voltage to the electrodes of the precipitating chamber, the value of this voltage increasing until the "corona" effect is obtained in the precipitating chamber, said corona effect absorbing a current equal to the current of substantially constant intensity supplied by the metadynes, the metadynes being provided with commutating poles for the commutation of the secondary current, each of the said poles being embraced by two coils, one of which is traversed by the primary current at low voltage and the other one is traversed by a current derived from the primary voltage which is generally a low voltage.

8. In a dust precipitating plant by means of electrostatic action, a precipitating chamber provided with electrodes, a plurality of primary generators, a plurality of generators of the metadyne type connected in series, supplying a direct current of substantially constant intensity at high voltage to the electrodes of the precipitating chamber, the value of this voltage increasing until the "corona" effect is obtained in the precipitating chamber, said corona effect absorbing a current equal to the current of substantially constant intensity supplied by the metadynes, the primary brushes of the said metadynes being supplied with current by primary generators which are driven by a separate shaft permitting regulation of its speed independently from the speed of the said metadynes in order to allow for the regulation of the characteristics of the whole high voltage set without touching any circuit at high voltage.

9. In a dust precipitating plant by means of electrostatic action, a precipitating chamber provided with electrodes, generators of the metadyne type connected in series, supplying a direct current of substantially constant intensity at high voltage to the electrodes of the precipitating chamber, the value of this voltage increasing until the "corona" effect is obtained in the precipitating chamber, said corona effect absorbing a current equal to the current of substantially constant intensity supplied by the metadynes, the metadynes connected in series with one another being provided with insulation between earth and units at higher voltages with respect to earth which is divided into a number of elements in series and which has conductive members located between said elements, some or all of said conductive members being electrically connected with terminals of units at lower voltages than the unit with which said members are respectively associated in such a way as to control the distribution of voltage over the said insulation.

10. In a dust precipitating plant by means of electrostatic action, a precipitating chamber provided with electrodes, a plurality of units each consisting of a primary generator and a metadyne, said metadyne being connected in series, and supplying a direct current of substantially constant intensity at high voltage to the electrodes of the precipitating chamber, the value of this voltage increasing until the "corona" effect is obtained in the precipitating chamber, said corona effect absorbing a current equal to the current of substantially constant intensity supplied by the metadynes, the primary brushes of the said metadynes being connected to the brushes of associated primary generators, means for connecting the brushes of said primary generators with the primary brushes of said metadynes, electrical conductors connecting the secondary brushes of said metadynes in series with one another, means including insulating couplings mechanically coupling said units together, driving means for rotating said metadynes and for rotating said primary generators; means for supporting said units one above the other in the form of a pile or tower preferably with their driving axes arranged vertically, said supporting means including insulating elements located between adjacent machines and the units operating at successively higher voltages with respect to earth being located successively higher in the pile or tower.

GIUSEPPE MASSIMO PESTARINI.